UNITED STATES PATENT OFFICE.

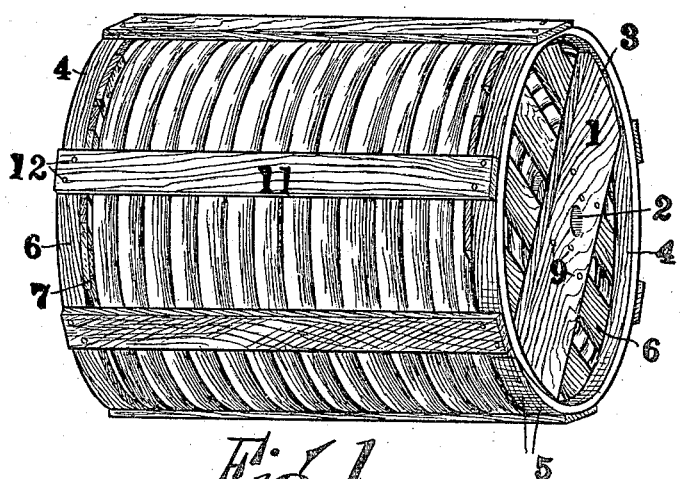

JOHN M. ALDERFER, OF SHARON CENTER, OHIO.

SHIPPING-PACKAGE.

960,766. Specification of Letters Patent. Patented June 7, 1910.

Application filed March 15, 1909. Serial No. 483,562.

*To all whom it may concern:*

Be it known that I, JOHN M. ALDERFER, a citizen of the United States, residing at Sharon Center, in the county of Medina and State of Ohio, have invented new and useful Improvements in Shipping - Packages, of which the following is a specification.

This invention relates to shipping packages especially designed for shipping long lengths of solid rubber tires or garden hose.

Heretofore in the manufacture of solid rubber tires and garden hose they have been customarily manufactured in lengths suitable for immediate use on the rims of vehicle wheels. The approximate length of the solid vehicle tires as shipped has been fifteen feet and in the case of garden or lawn hose they have usually been manufactured in lengths of twenty-five or fifty feet with the couplings mounted thereon and are loosely coiled for the market. The experience of the manufacturers and dealers is that in supplying solid vehicle wheel tires of determinate lengths there is a considerable amount of waste, due to the fact that the lengths of tires are always made considerably longer than the circumference of the standard wheel and the surplus thereof is necessarily cut away in mounting the tire and this surplus constitutes a loss of sufficient importance to a dealer or manufacturer to impair the profits.

In marketing garden hose it frequently happens that customers are desirous of purchasing pieces of different lengths than the arbitrary lengths in which the sections of hose are prepared for the market by the manufacturer.

In view of the foregoing it has recently been sought by the manufacturers of solid rubber tires and garden hose to market them in continuous lengths from which a desired section may be cut by the retail-dealer suited to the wants of the customer without any loss or waste occuring therefrom. This is peculiarly well illustrated in the sale of garden hose where the purchaser is frequently desirous of obtaining small sections of hose, but in order to do so it becomes necessary for him to purchase an entire section and the balance becomes substantially a loss either to the dealer or purchaser as the case may be. In view of the present manner of marketing goods of this class, a suitable reel for the shipment and marketing of continuous length tires or hose is required and therefore the primary object of this invention is to provide an improved reel of comparatively cheap construction which will hold a desired quantity of hose or tire, said reel so constructed that when set up the goods wound thereon are efficiently protected in transportation and the package is provided with suitable grasps for the hand of the user or the employee of the transportation company by which the same is shipped.

A further and important object sought by this invention is to so construct the reel as to make it comparatively inexpensive so that it will not be necessary to re-ship the empty reels to the factory after the supply of product has been sold therefrom, thus avoiding the expense incident to the re-shipment of the empty reel.

The invention further contemplates providing a reel for the purpose specified which will be strong, safe, durable, easily set up and efficient in use.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings, in which similar reference numerals indicate like parts in the different figures: Figure 1 is a perspective view of one form of a reel embodying this invention showing the same with a continuous length of garden hose wound thereon in condition for shipment. Fig. 2 is a view of a preferred type of cylinder employed on which the product is to be wound with portions thereof broken away to better illustrate the construction thereof. Fig. 3 is a view similar to Fig. 2 of a modified form of the device shown in Fig. 2; and, Fig. 4 is a perspective view of a modified form of head or side member for a reel constructed substantially as shown in Fig. 1.

My improved reel is constructed with a pair of head or end members each preferably comprising a transverse member 1 usually constructed of wood centrally apertured at 2, with its outer ends 3 thereof formed concentric to the axis of the aperture 2. Surrounding the member 1 and preferably concentric to the aperture 2 is an annular member or ring 4 secured to the ends of the member 1 by holdfast devices 5. Across the inner face of the members 1 and 2 are placed a plurality of slats 6 secured to the ring 4 by holdfast devices 7 and preferably secured to the transverse member 1 in a similar manner. Mounted on the inner faces of the slats 6 is a block 8 preferably rectangular in shape held in place by nails 9 or their equivalents extending to and preferably driven through the member 1 and clenched in the material of the block 8.

The cylinder or core portion of the reel 1 is formed of a plurality of strips 10 secured by nails or equivalent devices to the outer side faces of the blocks 8 and of such a length as to separate the end members a desired distance to permit the construction of reels of varying capacity which is accomplished by increasing or diminishing the lengths of the strips 10 employed in forming the cylinder or core. These strips 10 have preferably flat inner faces to lap the faces of the blocks 8 and with convex exteriors so that when positioned they will form an approximately true cylinder with the edges of adjacent strips preferably arranged in abutting relation with each other.

In practice, the two heads will be first formed and if manufactured at a point remote from the place where the same are to be erected, they will be preferably shipped without the positioning of the strips 10 which can be done by any ordinary workman as the reels are needed. The rubber tire or hose is wound on the reel in the ordinary manner, as clearly shown in Fig. 1, after which the device is further strengthened by fastening strips 11 on the outer faces of the annular members 4 and retaining them by holdfast devices 12.

From the foregoing it will be seen that when set up the reel may be readily handled and the merchandise wound thereon protected against any ordinary damage, the extended outer portions of the annular members 4 constituting hand grasps for the purpose of lifting or moving the reel from place to place. When the tire or hose is being wound or unwound from the reel the same is preferably mounted on a suitable standard embodying a rod passed through the apertures 2 in the end members and through the open portion of the core surrounded by the strips 10 and the rod constitutes an axle to permit free revolution of the reel.

In Fig. 3 a slightly different form of core is employed and it is constructed by securing to the inner faces of each of the end members a round block 13 preferably of wood and connecting said blocks by a sheet metal cylinder 14 through which may be passed holdfast devices 15 for securing the latter fixedly in position and uniting the end members thereto.

In Fig. 4 is a slight modification of the head shown in Fig. 1 and this head is constructed by inclosing a transverse member 16 similar to the member 1 in Fig. 1 with an annular member or ring 17 which is secured to the transverse member 16 in the same manner as has been described with reference to the ring 4. The space inclosed by the ring 17 is covered by a thin sheet 18 of suitable metal or thin wood, secured to the ring 17 by nails or other suitable devices. A block 19 is then nailed or otherwise securely fastened to the inner face of the sheet 18, preferably by passing nails 20 through the transverse member 16 into the material of the block 19. The member 16, sheet 18 and block 19 are preferably provided with a central aperture 21 through which may be passed a suitable instrumentality for rotatively sustaining a reel constructed with this type of head.

From the foregoing it will be seen that a reel constructed in accordance with this invention may be provided, with little or no expense as the various parts thereof may be constructed of what is known as scrap lumber, which otherwise would be of little or no value. At the same time a reel so constructed is exceedingly efficient and of sufficient strength to properly support the great weight of a long section of rubber tire or hose and protect the same against injury in shipment.

Having thus described my invention, what I claim and desire to secure by Letters Patent, is:—

A shipping package for rubber tires and garden hose embodying a pair of oppositely-disposed heads arranged in spaced relation with respect to each other and each consisting of a ring, a transversely-extending member arranged within and having its ends abutting against the inner face of the ring, hold-fast devices for securing said member to the ring, said member having its inner face flush with the inner edge of the ring, a plurality of slats arranged against the inner edge of the ring and having the ends thereof flush with the outer face of the ring, holdfast devices for securing the slats to the ring, hold-fast devices for securing the slats to said member, a block arranged against the inner face of each set of slats, hold-fast devices for securing said block in position, a core extending from one set of slats to the other and having its ends inclosing the said blocks, means extending through the ends of the core and engaging in the blocks for fixedly securing the core in position, and a plurality of bars having their ends fixedly secured to the outer faces of said rings.

In testimony whereof I have hereunto set my hand in presence of two subscribing witnesses.

JOHN M. ALDERFER.

Witnesses:
 GLENARA FOX,
 C. E. HUMPHREY.